United States Patent [19]
Simich

[11] 3,893,316
[45] July 8, 1975

[54] BALE TIE STRAIGHTENING APPARATUS

[75] Inventor: Emil Simich, Chicago, Ill.

[73] Assignee: A. J. Gerrard and Company, Des Plaines, Ill.

[22] Filed: Nov. 7, 1974

[21] Appl. No.: 521,578

[52] U.S. Cl. .................. 72/2; 72/132; 72/162; 140/140
[51] Int. Cl.² ................ B21D 3/02; B21F 1/02
[58] Field of Search ........ 140/73, 140; 72/1, 2, 132, 72/133, 160, 162

[56] References Cited
UNITED STATES PATENTS

| | | | |
|---|---|---|---|
| 1,751,094 | 3/1930 | Matteson | 140/140 |
| 2,101,860 | 12/1937 | Lewis et al. | 140/140 |
| 2,213,650 | 9/1940 | Grimshaw | 140/140 |
| 2,969,093 | 1/1961 | Jones | 140/140 |

*Primary Examiner*—Lowell A. Larson
*Attorney, Agent, or Firm*—Johnson, Dienner, Emrich & Wagner

[57] ABSTRACT

A first straightener unit includes freely-rotatable roller means for orienting the axis of a bale tie in a first plane. A second straightener unit includes freely-rotatable roller means for orienting the axis of the bale tie in a second plane normal to the first plane. A forward drive unit includes drive rollers for engaging the bale tie and advancing the same through the first and second straightener units. A rearward drive unit includes drive rollers for engaging the portion of the bale tie leaving the second straightener unit and drawing the bale tie through the first and second straightener units. Provided forwardly of the forward drive unit is severing means for severing the bale tie being straightened.

14 Claims, 12 Drawing Figures

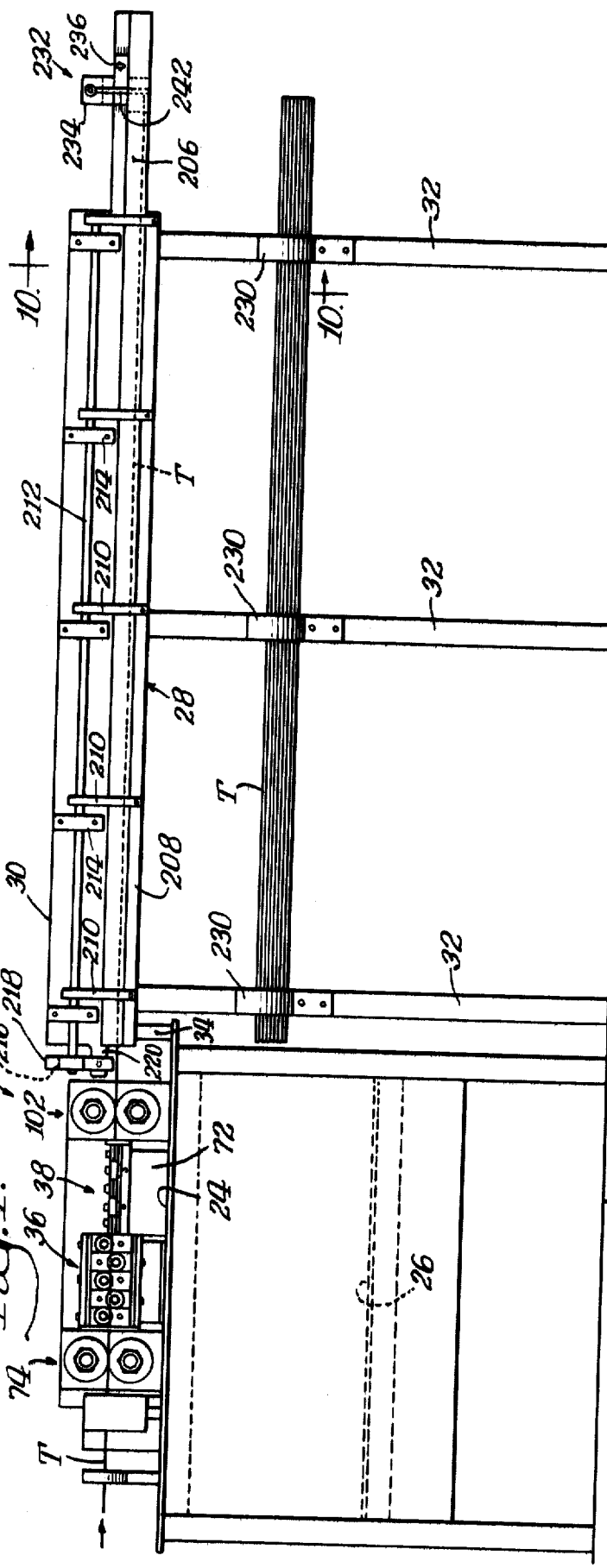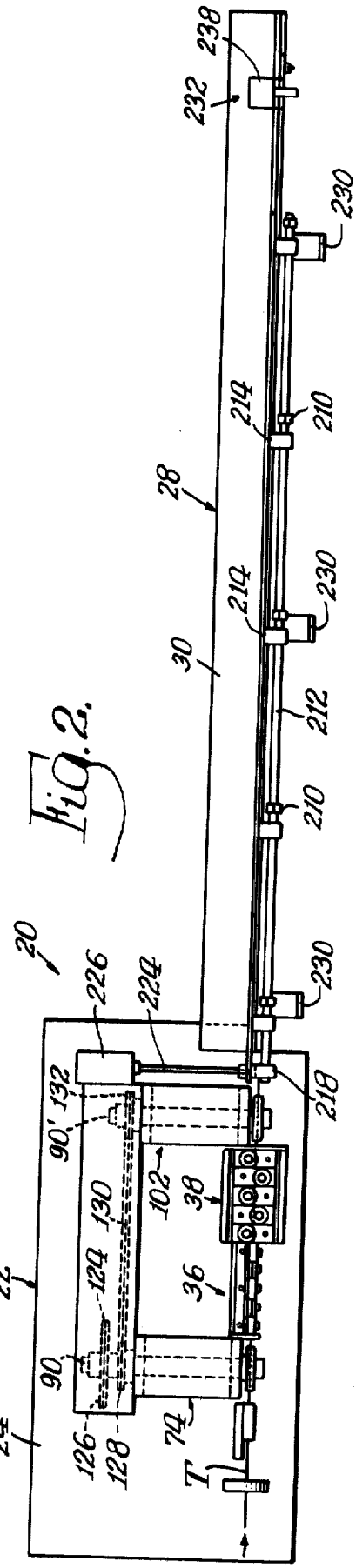

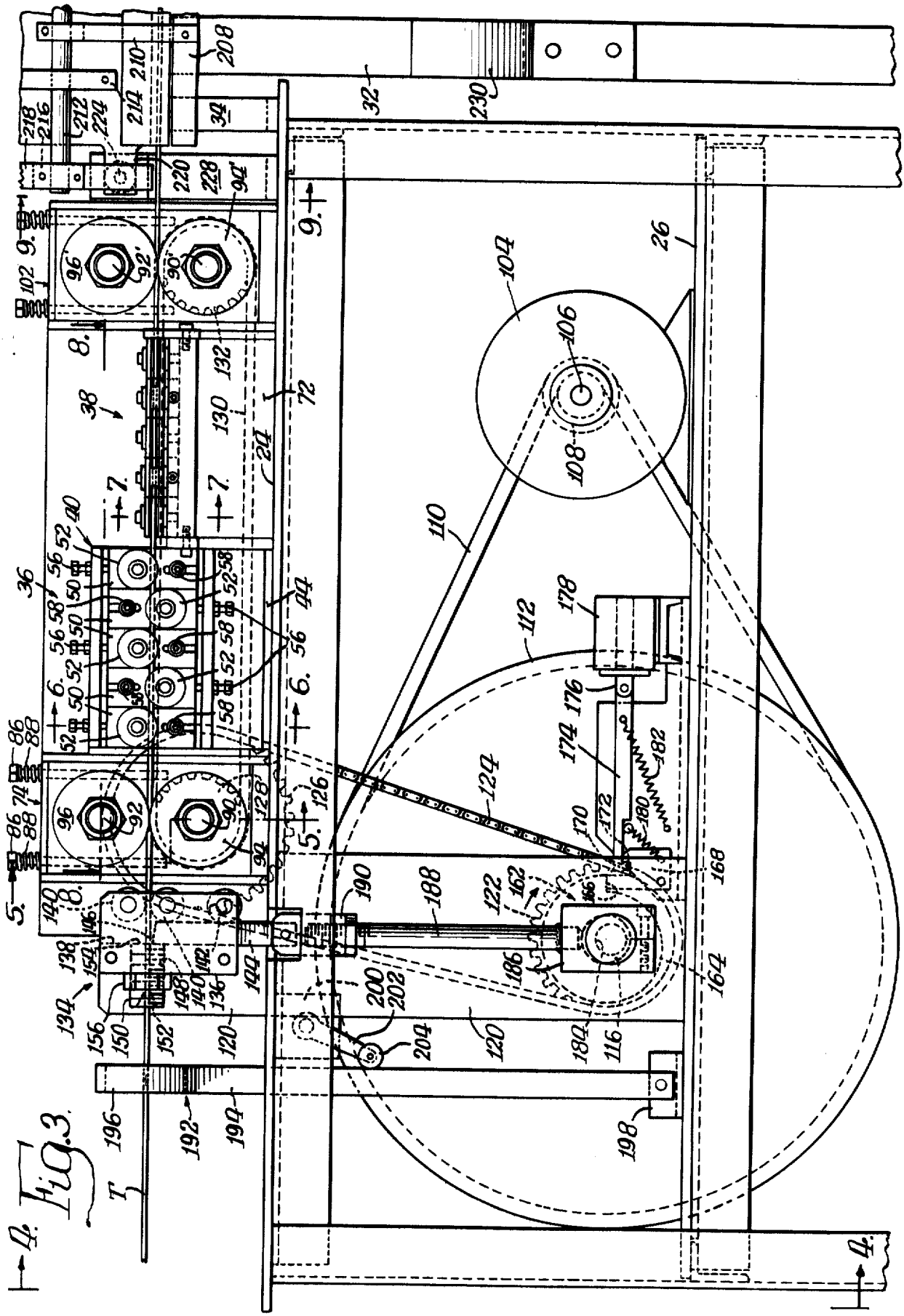

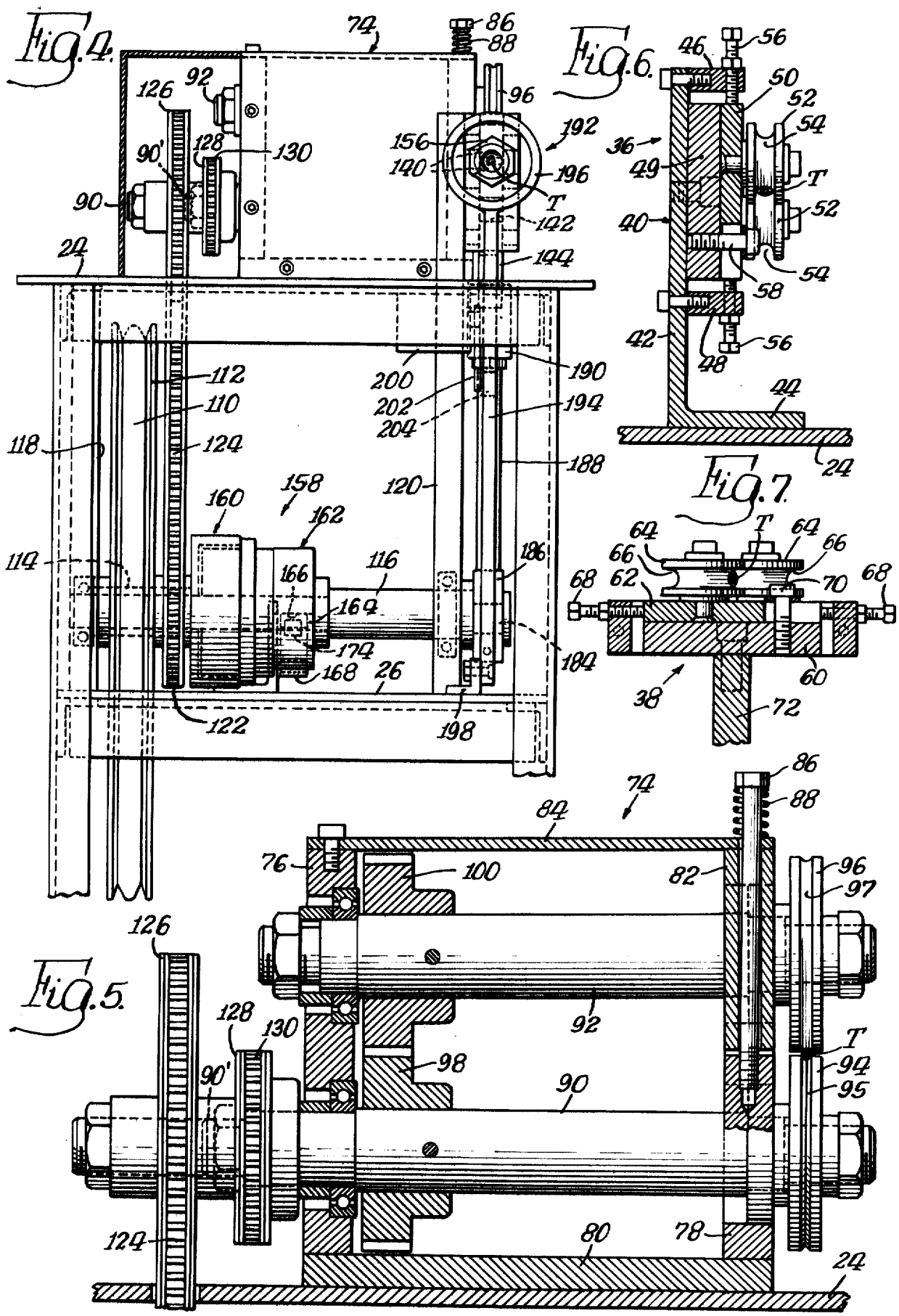

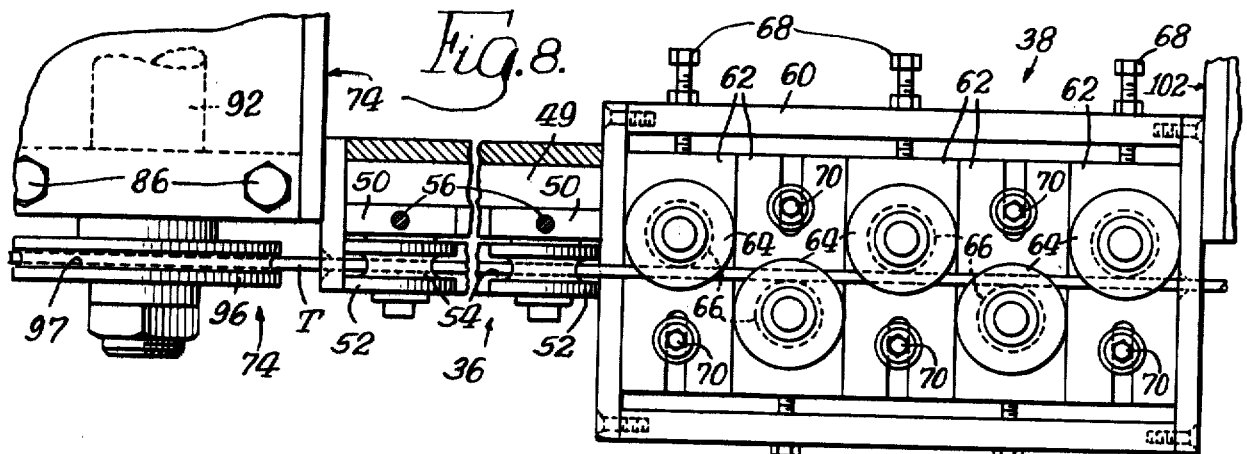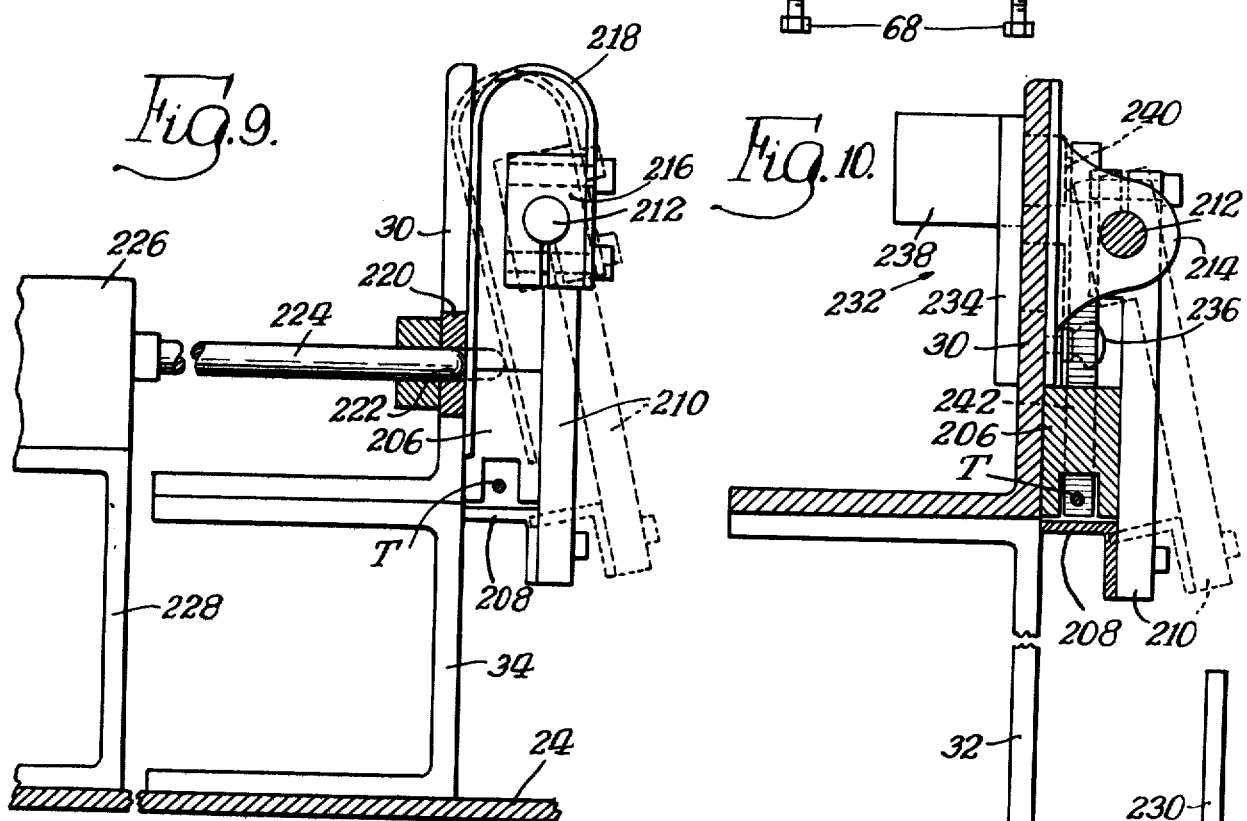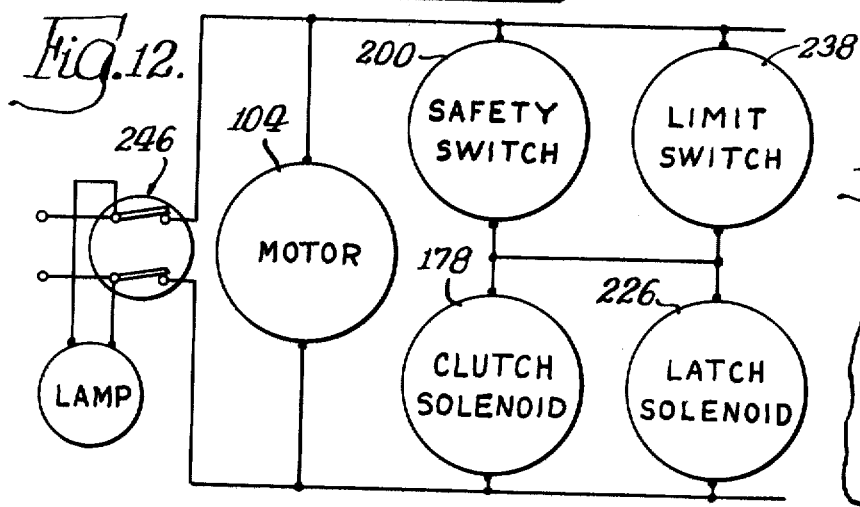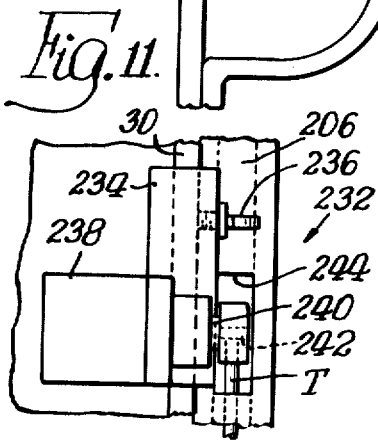

3,893,316

BALE TIE STRAIGHTENING APPARATUS

BACKGROUND OF THE INVENTION

Conventionally, a plurality of bale ties with preformed engaging end loops are disposed about an initially compressed bale of cotton or the like and the ends are interlocked to form a knot. Thereafter, at a warehouse or the like the bale ties are severed, the bale of cotton is further compressed, new bale ties are engaged about the bale of cotton, and the severed bale ties are discarded.

SUMMARY OF THE INVENTION

The present invention relates to apparatus for straightening and cutting to length a once-used bale tie.

In accordance with the present invention, at a warehouse or the like, the conventional bale ties are removed from the bale of cotton, one or both engaging end loops of each bale tie are severed, the bale of cotton is further compressed, with the apparatus of the present invention the original bale ties are straightened and cut to the designated length dictated by the further compressed bale of cotton, engaging end sections are reformed on the reworked bale ties, and these reconditioned bale ties are reengaged about the further compressed bale of cotton.

The apparatus of the present invention comprises first and second straightener units, forward and rearward drive units, main drive means for the drive units, severing means forwardly of the forward drive unit, and selectively operable auxiliary drive means for effecting actuation of the severing means.

A used bale tie is manually inserted into the forward drive unit which includes drive rollers that engage the bale tie and advance the same through the first and second straightener units. The first straightener unit includes freely-rotatable roller means that orient the axis of the bale tie in a first plane, while the second straightener unit includes freely-rotatable roller means that orient the axis of the bale tie in a second plane normal to the first plane. The rearward drive unit includes drive rollers that engage the portion of the bale tie leaving the second straightener unit and draw the bale tie through the first and second straightener units. While the bale tie is being straightened it is cut to length by the severing means.

BRIEF DESCRIPTION OF THE DRAWINGS

FIG. 1 is a side elevational view of the bale tie straightening apparatus of the present invention;

FIG. 2 is a plan view of the apparatus of FIG. 1;

FIG. 3 is an enlarged side elevational view of a portion of the apparatus of FIG. 1;

FIG. 4 is a front elevational view of the apparatus taken substantially in the plane of the line 4—4 in FIG. 3 looking in the direction indicated by the arrows;

FIG. 5 is a vertical sectional view, on an enlarged scale, taken substantially along the line 5—5 in FIG. 3 looking in the direction indicated by the arrows;

FIG. 6 is a vertical sectional view, on an enlarged scale, taken substantially along the line 6—6 in FIG. 3 looking in the direction indicated by the arrows;

FIG. 7 is a vertical sectional view, on an enlarged scale taken substantially along the line 7—7 in FIG. 3 looking in the direction indicated by the arrows;

FIG. 8 is an enlarged horizontal view, foreshortened and partly in section, taken substantially along the line 8—8 in FIG. 3 looking in the direction indicated by the arrows;

FIG. 9 is a vertical foreshortened sectional view, on an enlarged scale, taken substantially along the line 9—9 in FIG. 3 looking in the direction indicated by the arrows;

FIG. 10 is a vertical foreshortened sectional view, on an enlarged scale, taken substantially along the line 10—10 in FIG. 1 looking in the direction indicated by the arrows;

FIG. 11 is a fragmentary plan view of the portion of the apparatus shown in FIG. 10; and FIG. 12 is a schematic view of the electrical circuit of the apparatus of the present invention.

DESCRIPTION OF THE PREFERRED EMBODIMENT

Referring now to FIGS. 1 and 2, there is indicated generally by the reference numeral 20 bale tie straightening apparatus embodying the principles of the present invention. The apparatus 20 includes main frame means 22 providing an upper platform 24 and an intermediate platform 26, and frame extension means 28 having an elongated horizontal L-shaped support member 30 supported on legs 32 and on an angle bracket 34 secured to the upper platform 24.

Supported on the upper platform 24 of the main frame means 22 are a first vertically disposed straightener unit 36 and a second horizontally disposed straightener unit 38.

As shown in FIGS. 3 and 6, the first straightener unit 36 comprises a frame 40 having a back 42, a lower leg 44 secured to the upper platform 24, and upper and intermediate legs 46 and 48. Mounted within the frame 40 against a spacer 49 are a plurality of side-by-side support blocks 50 which freely rotatably support rollers 52 on horizontal axes. Each roller 52 is formed with a peripheral groove 54 whose depth is greater than the radius of curvature of the bottom thereof. Each support block 50 is vertically adjustable by an adjustment screw 56 and is secured in adjusted position by a set screw 58.

As shown in FIGS. 7 and 8, the second straightener unit 38 comprises a generally U-shaped frame 60. Mounted within the frame 60 are a plurality of side-by-side support blocks 62 which freely rotatably support staggered rollers 64 on vertical axes. Each roller 64 is formed with a peripheral groove 66 whose depth is greater than the radius of curvature of the bottom thereof. Each support block 62 is horizontally adjustable by an adjustment screw 68 and is secured in adjusted position by a set screw 70. The frame 60 is supported on the upper platform 24 by means of a vertical plate member 72.

Disposed forwardly of the first straightener unit 36 is a forward drive unit 74 which, as best shown in FIGS. 3 and 5, comprises a stationary back bearing wall 76 and a stationary lower front bearing block 78 secured to a lower plate member 80 in turn secured to the upper platform 24. Arranged above the bearing block 78 is a floating upper front bearing block 82 interconnected by an upper plate member 84 with the back bearing wall 76. Two bolts 86 extend through apertures in the upper plate member 84 and the upper bearing block 82 and are threaded into the lower bearing block 78. Coil springs 88 are interposed between the heads of bolts 86 and the upper plate member 84. The springs 88 spring bias the upper bearing block 82 toward the lower bearing block 78 while the upper plate member 84 is free to flex and thus serves in a hinge-like capacity. The pressure exerted by the springs 88 can be varied by adjusting the bolts 86. A lower shaft 90 is journaled in the back bearing wall 76 and in the lower front bearing block 78, and an upper shaft 92 is journaled in the back bearing wall 76 and in the upper front bearing block 82. Secured on the front ends of the shafts 90 and 92, respectively, are a lower drive roller 94 having a V-shaped peripheral groove 95 and an upper drive roller 96 having an arcuate peripheral groove 97. For conjoint rotation of the shafts 90 and 92, meshing spur gears 98 and 100 are secured thereon.

As shown in FIGS. 1–3, a rearward drive unit 102 is mounted on the upper platform 24 rearwardly of the second straightener unit 38. The rearward drive unit 102, except for the length of the lower shaft, is substantially identical to the forward drive unit 74 and primed reference numerals have been used to identify corresponding parts.

Main drive means for driving the forward and rearward drive units 74 and 102 comprises an electric motor 104 (FIG. 3) mounted on the intermediate platform 26. Secured on the output shaft 106 of the motor 104 is a pulley 108 which is connected by a belt 110 to a pulley 112. The pulley 112 (FIG. 4) is secured to a sleeve member 114 journaled on a main shaft 116 which in turn is journaled in vertical frame members 118 and 120 secured to the upper and intermediate platforms 24 and 26. Also secured to the sleeve member 114 is a sprocket 122 connected by a chain 124 to a sprocket 126 secured to the lower shaft 90 of the forward drive unit 74. Also secured to the shaft 90 is a sprocket 128 connected by a chain 130 to a sprocket 132 (FIG. 2) secured to the lower shaft 90' of the rearward drive unit 102.

As shown in FIG. 3, severing means 134 comprises a guide block 136 secured to the upper end of the frame member 120. The guide block 136 is formed with a vertical channel 138, and provides support for a plurality of rollers 140 and 142 along the open side of the channel 138. Slidable in the channel 138 and along the rollers 140 and 142 is a rectangular knife or tool bit 144 having an upper cutting edge 146. Threaded in a horizontal opening 148 of the guide block 136 is a guide sleeve 150 formed with a forward bell mouth 152 and a rearward shearing face 154. The guide sleeve 150 is positioned with its shearing face 154 flush with the adjacent wall of the channel 138, and is held in adjusted position by a lock nut 156.

Auxiliary drive means for effecting actuation of the severing means 134 comprises, as shown in FIG. 4, conventional single-revolution clutch means 158. The clutch means 158 includes a first rotatable assembly 160 secured to the sleeve member 114 for rotation with the main drive means, and a second rotatable assembly 162 secured to the main shaft 116 and rotatable with the first rotatable assembly 160. The second rotatable assembly 162 is formed with an arcuate cam surface 164 and a stop shoulder 166. As shown in FIG. 3, a pawl 168 is engaged with the stop shoulder 166 for holding the second rotatable assembly 162 against rotation. The pawl 168 is formed with a pocket 170 which is engaged by the tooth 172 of a trip member 174 pivotally connected to the plunger 176 of a solenoid 178.

When the solenoid 178 is energized the plunger 176 and trip member 174 are drawn to the right, and the pawl is pivoted clockwise out of engagement with the stop shoulder 166, whereupon the second rotatable assembly 162 is permitted to rotate with the first rotatable assembly 160. Immediately the pawl snaps free of the trip member 174 and is urged against the cam surface 164 by a spring 180. At the conclusion of one revolution of the second rotatable assembly 162, the pawl 168 is again engaged with the stop shoulder 166 for stopping the second rotatable assembly 162. When the solenoid 178 is deenergized, the trip member 174 is urged to the left by a spring 182 and the tooth 172 is again engaged with the pocket 170.

As shown in FIGS. 3 and 4, the main shaft 116 is formed with an eccentric reduced end portion 184 on which is journaled a thrust block 186. A thrust rod 188 at its lower end is secured in the thrust block 186 and at its upper end has adjustably threaded thereon a clevis 190. Pivotally mounted in the clevis 190 is the lower end of the knife 144. Whenever the second rotatable assembly 162 and main shaft 116 rotate one revolution, the eccentric shaft end portion 184 causes the thrust rod 188 to oscillate up and down once thereby effecting actuation of the severing means 134.

Arranged forwardly of the severing means 134, as shown in FIGS. 3 and 4, is safety means 192. The safety means 192 comprises an upstanding lever 194 provided with a ring portion 196 at its upper end and pivotally mounted at its lower end to a bracket 198 secured to the intermediate platform 26. Mounted to the underside of the upper platform 24 is a normally open switch 200 having a pivotal switch arm 202 with a roller 204 spring biased against the lever 194. When the lever 194 is pivoted clockwise as viewed in FIG. 3, the switch arm 202 is pivoted counterclockwise and the switch 200 is thereby closed for a purpose to be described hereinafter. When the lever 194 is released, it is returned by the switch arm 202 to its normal position and the switch 200 is opened.

Referring now to FIGS. 1, 2, 9 and 10, an inverted U-shaped channel member 206 is secured along the support member 30 of the frame extension means 28. Normally disposed immediately below the channel member 206 is a ledge member 208 secured to the lower ends of arm members 210. The upper ends of the arm members 210 are secured to an elongated rod 212 journaled in bearing blocks 214 secured along the support member 30. The channel member 206 and ledge member 208 serve to receive and confine a straightened bale tie as it leaves the rearward drive unit 102.

Secured to the left end of the elongated rod 212, as viewed in FIG. 1, is a block member 216 which carries a horsehsoe spring 218 (FIG. 9) with one leg normally abuting a projecting portion 220 of the support member 30. Slidably mounted in an aperture 222 of the projecting portion 220 is the plunger 224 of a solenoid 226 supported on an angle bracket 228 secured to the upper platform 24. When the solenoid 226 is energized, the plunger 224 is distended and pivots the ledge means (elements 208, 210, 212, 216 and 218), from the solid line position shown in FIGS. 9 and 10 to the dotted line position, for releasing a straightened bale tie and permitting it to fall from the channel member 206. Secured to the legs 32 below the ledge member 208 are bale tie collecting brackets 230. When the solenoid 226 is deenergized, the indicated ledge means returns to the solid line position shown in FIGS. 9 and 10.

Adjustably mounted on the right end of the support member 30, as viewed in FIG. 1, is limit means 232 which comprises a frame member 234 slidable along the support member 30 and secured in adjusted position by a wing bolt 236. As best shown in FIGS. 10 and 11, the frame member 234 carries a normally open switch 238 having a rotary operating shaft 240 to which is secured the upper end of a limit or arm member 242. The lower end of the arm member 242 extends into a cutout portion 244 of the channel member 206. When the arm member 242 is engaged and pivoted from its normal vertical position by the leading end of a bale tie, the switch 238 is closed for a purpose to be presently described. When the bale tie is disengaged from the limit member 242, the latter returns to its normal vertical position and the switch 238 is opened.

Shown in FIG. 12 is a schematic view of the electrical circuit of the apparatus of the present invention. Normally, when the main switch 246 is closed, the motor 104 is energized, while the solenoids 178 and 226 remain deenergized because the switches 200 and 238 are open. When either of the switches 200 or 238 is closed, both of the solenoids 178 and 226 are energized.

Operationally, a used bale tie (T) is manually inserted through the safety lever ring portion 196 and the guide sleeve 150 into the forward drive rollers 94 and 96. These rollers engage the bale tie and advance the same through the first and second straightener units 36 and 38. The rollers 52 of the first straightener unit 36 orient the axis of the bale tie in a horizontal plane, while the rollers 64 of the second straightener unit 38 orient the axis of the bale tie in a vertical plane normal to the horizontal plane. The rearward drive rollers 94' and 96' engage the portion of the bale tie leaving the second straightener unit 38, draw the bale tie through the straightener units 36 and 38, and discharge the bale tie into the channel member 206 and above the ledge member 208. When the leading end of the bale tie engages and pivots the limit member 242, the switch 238 is closed and the solenoids 178 and 226 are energized. Energization of the solenoid 178 effects actuation of the severing means 134, and the knife 144 moving across the shearing face 154 of the guide sleeve 150 severs or cuts the bale tie to a length determined by the distance between the shearing face 154 and the normal vertical position of the limit member 242. Energization of the solenoid 226 effects pivoting of the ledge member 208 away from the channel member 206 permitting the straightened bale tie to drop therefrom into the collecting brackets 230. When the limit member 242 returns to its normal position, the switch 238 opens and the solenoids 178 and 226 are deenergized thereby conditioning the apparatus for straightening and cutting to length another used bale tie. Should an operator fail or be unable to release his hand from a bale tie inserted and being drawn into the apparatus, his hand will engage and pivot the ring portion 196 of the safety lever 194 causing the switch 200 to be closed and the solenoids 178 and 226 to be energized. The bale tie is then immediately severed, thereby removing any pull on the portion of the bale tie within the operator's hand and preventing the operator's hand from being drawn into the apparatus.

By providing spring biased upper drive rollers 96 and 96' and adjustable straightener rollers 52 and 64, the apparatus of the present invention is adapted to straighten and cut to length bale ties of different gauges and different cross sectional configurations. When necessary, the guide sleeve 150 may be removed, the shearing face 154 reground, and the sleeve 150 threadingly repositioned with the reground face 154 flush with the adjacent wall of the channel 138. Also when necessary, the knife 144 may be removed, the cutting edge 146 reground, and the knife 144 repositioned with the reground edge 146 in proper cutting location by adjustment of the threaded clevis 190. The desired length to which a bale tie is to be cut may be varied by adjusting the limit means 232 along the support member 30.

While there has been shown and described a preferred embodiment of the present invention, it will be understood by those skilled in the art that various rearrangements and modifications may be made therein without departing from the spirit and scope of the invention.

The invention claimed is:

1. For use in straightening a bale tie, apparatus comprising frame means, a first straightener unit supported by said frame means and including freely-rotatable roller means for orienting the axis of the bale tie in a first plane, a second straightener unit supported by said frame means and including freely-rotatable roller means for orienting the axis of the bale tie in a second plane normal to said first plane, a forward drive unit supported by said frame means and including drive rollers for engaging the bale tie and advancing the same through said first and second straightener units, a rearward drive unit supported by said frame means and including drive rollers for engaging the portion of the bale tie leaving said second straightener unit and drawing the bale tie through said first and second straightener units, main drive means for driving said forward and rearward drive units, severing means forwardly of said forward drive unit for severing the bale tie being straightened, and selectively operable auxiliary drive means for effecting actuation of said severing means.

2. The apparatus of claim 1 wherein said forward and rearward drive units each comprise a stationary back bearing wall, a stationary lower front bearing block, a floating upper front bearing block spring biased toward said lower bearing block, a lower shaft journaled in said back bearing wall and in said lower front bearing block and on which one of said drive rollers is secured, an upper shaft journaled in said back bearing wall and in said upper front bearing block and on which one of said drive rollers is secured, one of said lower and upper shafts having connection with said main drive means, and means between said lower and upper shafts whereby the same are rotated conjointly.

3. The apparatus of claim 1 including limit means rearwardly of said rearward drive unit and engageable by the leading end of the bale tie for rendering said auxiliary drive means operable whereby the bale tie is cut to a predetermined length.

4. The apparatus of claim 3 wherein said limit means comprises normally open limit switch means connected with said auxiliary drive means, and a pivotally mounted limit member when engaged by the leading end of the bale tie serving to close said limit switch means.

5. The apparatus of claim 1 including safety means forwardly of said forward drive unit and when engaged by an operator's hand serving to render said auxiliary drive means operable whereby the bale tie is severed.

6. The apparatus of claim 5 wherein said safety means comprises normally open safety switch means connected with said auxiliary drive means, and a pivotally mounted safety lever when engaged by an operator's hand serving to close said safety switch means.

7. The apparatus of claim 1 including ledge means normally positioned to receive the straightened bale tie as it leaves said rearward drive unit, solenoid means having a plunger engageable with said ledge means, and means for energizing said solenoid means whereby said plunger is distended and moves said ledge means for releasing the straightened bale tie.

8. The apparatus of claim 1 wherein said auxiliary drive means comprises clutch means having a first rotatable assembly connected with said main drive means for rotation therewith and having a second rotatable assembly rotatable with said first rotatable assembly, said second rotatable assembly having a stop shoulder, a pawl engageable with said shoulder for holding said second rotatable assembly against rotation, solenoid means for withdrawing said pawl from engagement with said shoulder whereby said second rotatable assembly is permitted to rotate with said first rotatable assembly, and thrust rod means moved by rotation of said second rotatable assembly for effecting actuation of said severing means.

9. The apparatus of claim 8 including ledge means normally positioned to receive the straightened bale tie as it leaves said rearward drive unit, second solenoid means having a plunger engageable with said ledge means, normally open switch means connected with said solenoid means of said auxiliary drive means and said second solenoid means, and a pivotally mounted limit member rearwardly of said rearward drive unit and when engaged by the leading end of the bale tie serving to close said switch means whereby said solenoid means of said auxiliary drive means is energized for withdrawing said pawl and whereby said second solenoid means is energized for distending said plunger and moving said ledge means releasing the straightened bale tie.

10. The apparatus of claim 1 wherein said severing means comprises guide block means, a horizontal guide sleeve presenting a shearing face, said guide sleeve being threaded in said guide block means and serving to guide the bale therethrough and into said forward drive unit, a vertical knife slidable in said guide block means and having a cutting edge for severing the bale tie at said shearing face, and sliding of said knife being effected by said auxiliary drive means.

11. The apparatus of claim 1 wherein said severing means comprises guide block means through which the bale tie passes while advancing into said forward drive unit, a vertical knife slidable in said guide block means for severing the bale tie, and sliding of said knife being effected by said auxiliary drive means.

12. The apparatus of claim 11 wherein said auxiliary drive means comprises clutch means having a first rotatable assembly connected with said main drive means for rotation therewith and having a second rotatable assembly rotatable with said first rotatable assembly, said second rotatable assembly having a stop shoulder, a pawl engageable with said shoulder for holding said second rotatable assembly against rotation, solenoid means for withdrawing said pawl from engagement with said shoulder whereby said second rotatable assembly is permitted to rotate with said first rotatable assembly, and thrust rod means moved by rotation of said second rotatable assembly for effecting sliding of said knife.

13. The apparatus of claim 12 including normally open switch means connected with said solenoid means, and a pivotally mounted limit member rearwardly of said rearward drive unit and when engaged by the leading end of the bale tie serving to close said switch means whereby said solenoid means is energized for withdrawing said pawl.

14. The apparatus of claim 1 wherein said freely-rotatable roller means comprise staggered rollers each of which is formed with a peripheral groove whose depth is greater than the radius of curvature of the bottom thereof.

* * * * *